(12) United States Patent
Lefkovitz

(10) Patent No.: US 8,613,402 B2
(45) Date of Patent: Dec. 24, 2013

(54) ESSENCE EXTRACTOR

(75) Inventor: Joshua A. Lefkovitz, Akron, OH (US)

(73) Assignee: Zing Anything, LLC, Akron, OH (US)

( * ) Notice: Subject to any disclaimer, the term of this patent is extended or adjusted under 35 U.S.C. 154(b) by 403 days.

(21) Appl. No.: 12/961,828

(22) Filed: Dec. 7, 2010

(65) Prior Publication Data
US 2013/0200183 A1     Aug. 8, 2013

(51) Int. Cl.
*A47J 31/44* (2006.01)

(52) U.S. Cl.
USPC ............... 241/30; 99/286; 99/287; 99/304; 99/318; 99/323; 99/510; 99/513; 241/100; 241/69; 241/169.1

(58) Field of Classification Search
USPC ............ 241/100, 169.1, 30, 24.11, 21, 69; 99/286, 287, 289, 304, 316, 317, 318, 99/323, 510, 513
See application file for complete search history.

(56) References Cited

U.S. PATENT DOCUMENTS

| | | | |
|---|---|---|---|
| 2,589,783 A * | 3/1952 | Crossley et al. | 99/295 |
| 5,431,276 A * | 7/1995 | Lialin | 206/222 |
| 5,884,759 A * | 3/1999 | Gueret | 206/222 |
| 6,372,270 B1 * | 4/2002 | Denny | 426/77 |
| 6,705,490 B1 * | 3/2004 | Lizerbram et al. | 222/145.1 |
| 6,945,486 B2 | 9/2005 | Teng | |
| 6,962,254 B2 * | 11/2005 | Spector | 206/222 |
| 7,147,174 B2 | 12/2006 | Mansen | |
| 7,367,519 B2 | 5/2008 | de Groote et al. | |
| 7,422,170 B2 | 9/2008 | Bao | |
| D591,554 S | 5/2009 | Ruzycky | |
| 7,537,112 B2 * | 5/2009 | Balazik | 206/222 |
| 7,552,673 B2 * | 6/2009 | Levin | 99/323.3 |
| 7,562,782 B2 * | 7/2009 | Yorita | 215/228 |
| 7,568,576 B2 * | 8/2009 | Sweeney et al. | 206/219 |
| D606,369 S | 12/2009 | Ruzycky | |
| 2007/0204467 A1 | 9/2007 | Livie | |
| 2010/0031827 A1 * | 2/2010 | Lai | 99/306 |

* cited by examiner

*Primary Examiner* — Mark Rosenbaum
(74) *Attorney, Agent, or Firm* — John D. Gugliotta, PE, Esq

(57) ABSTRACT

An improved portable essence extractor in combination with a liquid container for the direct blending of freshly extracted edible and aromatic oils and such is provided. A portable essence extractor and liquid container combination is provided in which an essence extraction assembly may be removably connected to, and in fluid communication with, a liquid dispensing container. The container is operatively connected to the essence extraction assembly such that it is removably connects to the liquid dispensing container, as well as in fluid communication with the liquid volume. Placement of the essence extraction assembly at the top, bottom, middle, or any specific orientation or configuration should be equivalent, given the fluid communication between the comminuted foodstuff and the liquid volume such that the extraction of edible and aromatic oils can directly blend with any liquid contents of the volume.

21 Claims, 16 Drawing Sheets

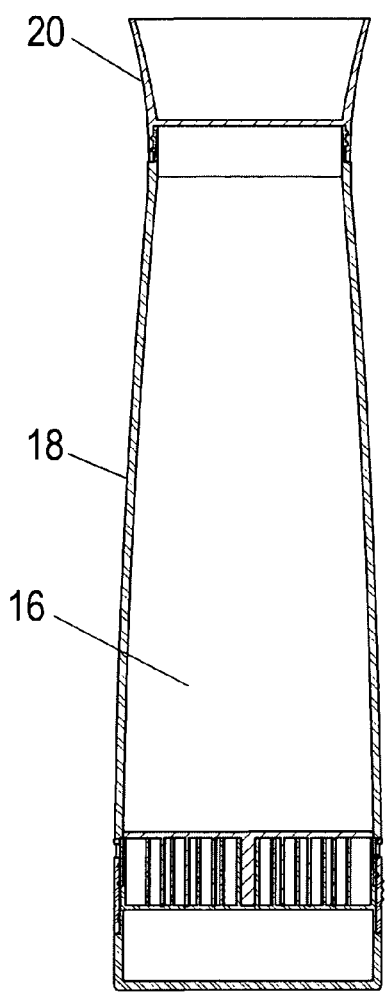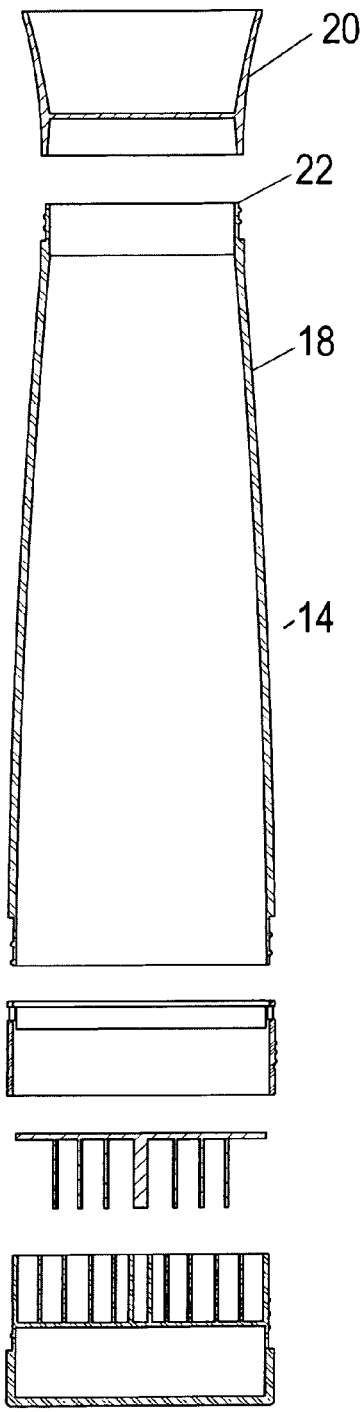
FIG. 3A
FIG. 3B

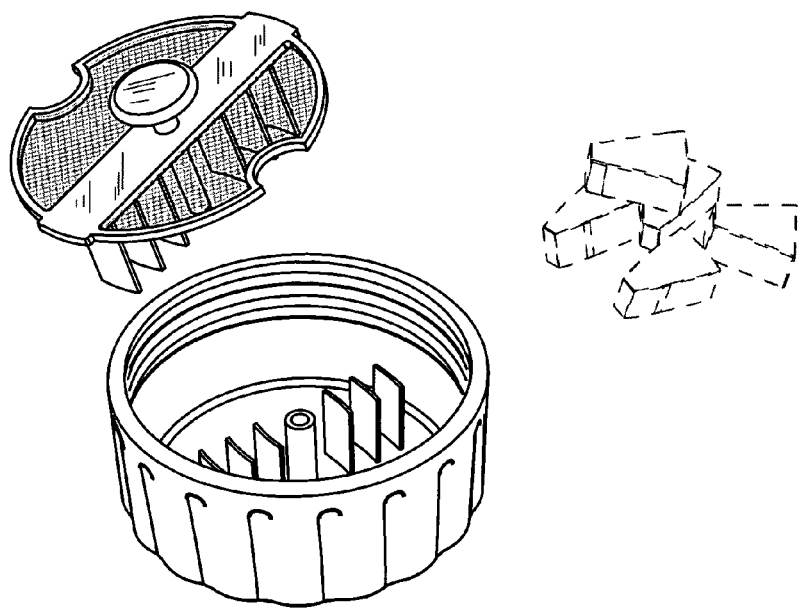
FIG. 16
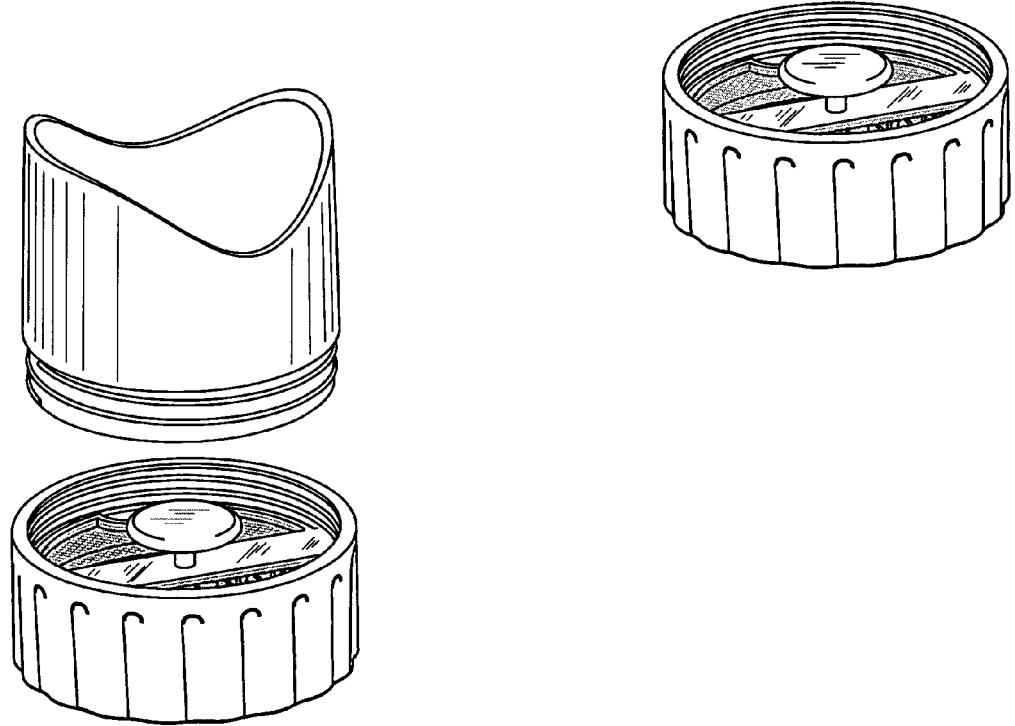

FIG. 17
FIG. 18
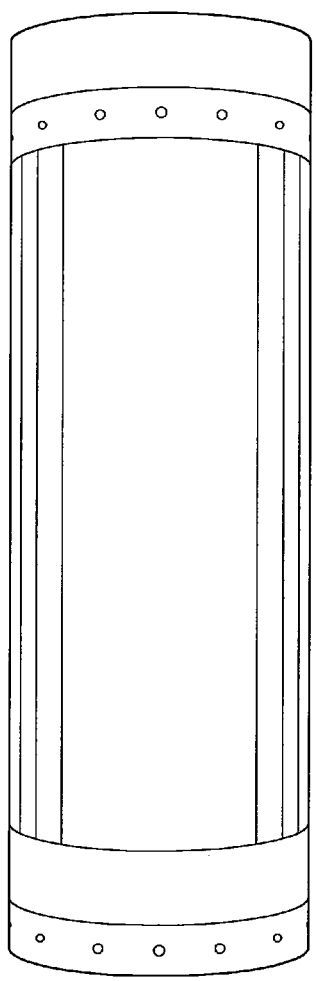
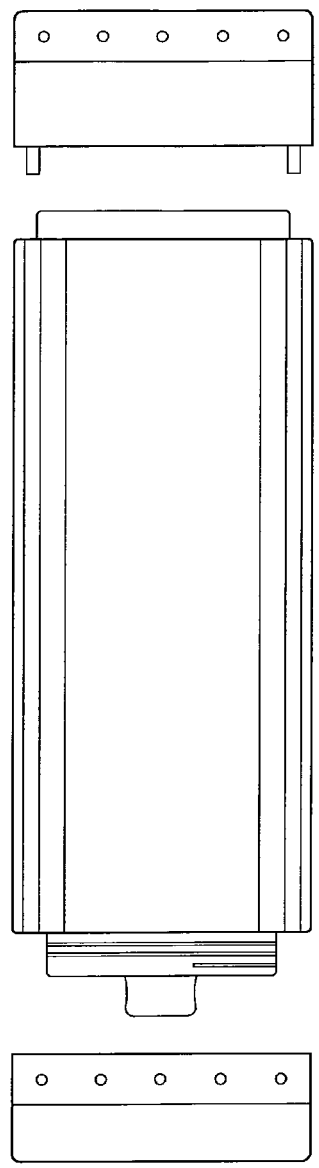

ESSENCE EXTRACTOR

RELATED APPLICATIONS

None.

BACKGROUND OF THE INVENTION

1. Field of the Invention

The present invention relates generally to an essence extractor for comminuting of foodstuffs for the extraction of edible and aromatic oils and, more particularly, to a portable essence extractor in combination with a liquid container for the direct blending of freshly extracted edible and aromatic oils and such.

2. Description of the Related Art

Hand-held kitchen tools for the comminuting of foodstuffs and the like are well known in the art. Examples include tools for the grinding or mincing of nuts or garlic for use as a component in food preparation. Such devices generally employed squeeze-type implements wherein, through the manipulation of a pair of hinged arms, a plunger engages within a chamber with a perforated bottom to progressively crush a chamber-received clove with the particle and liquid effluent discharging through the perforated bottom of the chamber. In most instances, a major portion of the clove or cloves will remain within the chamber as a pulverized mass which will normally be discarded.

A search of the prior art discovers various other mincing or comminuting devices. While a search did not disclose any patents that read directly on the claims of the instant invention; however, the following references were considered related.

Another form of garlic tool is disclosed in U.S. Pat. No. 6,945,486, issued in the name of Teng, which includes a pair of interesting pressure units respectively having protruding rows of linearly aligned "grater elements" wherein the grater elements of one row alternate with the grater elements of the second row for what the inventor refers to as a peeling, pressing and grating of unpeeled garlic cloves there between. The rotation of the pressure units of Teng relative to each other will result in a corresponding rotation of the elements of the opposed rows about a center of rotation toward alignment wherein all of the elements of one row are in intimate alternating alignment with the elements of the other row. Such an arrangement would appear to move an engaged garlic clove radially outward from the center of rotation along the rather blunt and wide engaging faces of the elements. This in turn would tend to encourage the major crushing action to occur toward the outer circumference of the grating chamber wherein outward movement of the garlic will be limited by the peripheral wall. As such, it is likely that substantial force would be required to maintain the desired twisting action between the two hand manipulated pressure units. Should, to the contrary, the actual grating in Teng occur along the full length of the rows, the linear arrangement of both sets of elements will result in a rotational period wherein all of the elements are aligned. This simultaneous alignment of all of the elements of each set alternating with the elements of the other set with an engaged clove there between could also tend to produce increased resistance to rotation.

U.S. Pat. No. 7,147,174, issued in the name of Mansen, discloses a comminuting device adapted for comminuting material and comprising a pair of hand held (fitting within and between the users palms) mating sections forming an enclosed interior chamber with the two second sections capable of movement relative to each other. The first mating section has a first set of a plurality of pins, which extend from a base of the first mating section and into the interior of the chamber. Similarly, the second mating section has a second set of a plurality of pins extending from a base of the second mating section and into the interior of the chamber. The pins from the first mating section interdigitate with the second set of a plurality of pins when the first and second mating sections are mated, wherein movement of the first and second mating sections relative to one another causes comminuting of the material when placed in the chamber. The pins have varying cross-sectional shapes including circular, triangular, and hexagonal.

U.S. Pat. No. 7,422,170, issued in the name of Bao, discloses a leaves and seeds hand grinder having a grinder actuator, a first grinding plate, a second grinding plate and a detachable coupling arrangement. The first grinding plate is detachably coupling with the grinder actuator, wherein the first grinding plate has a plurality of first grinding knifes downwardly and spacedly extended from a bottom side of the first grinding plate. The second grinding plate has a plurality of second grinding knifes upwardly and spacedly extended from the top side of the second grinding plate at a position that the first and second grinding knifes are spacedly disposed within a grinding compartment, such that when the grinder actuator is turned with respect to the grinder base to drive the first grinding plate to rotate, the first and second grinding knifes are correspondingly moved within the grinding compartment to provide a grinding action.

U.S. Pat. No. 7,367,519, issued in the name of de Groote et al., discloses a processing tool for foodstuffs such as garlic and like edibles including a container mounted comminuting unit having-upper-and lower sets of spaced linearly aligned blades selectively presented in an upwardly directed operating position upon an inverting of the unit, the blades of each set having a comminuting profile differing from that of the blades of the other set and are selectively engaged by a set of spaced pusher teeth aligned along a sinusoidal path and mounted on an overlying cap for, upon rotation of the cap relative to the comminuting unit, moving an edible through the comminuting blades for the desired comminuting thereof, the cap including a separate chamber for preparation of the edible before the comminuting process.

U.S. Pat. No. Des 591,554, issued in the name of Ruzycky, discloses an ornamental design for a food grinder having a housing substantially designed to resemble a bulb of garlic.

And, U.S. Patent Application Publication No. 2007/0204467, published in the name of Livie, discloses a dicing and cutting device very similar to that shown in the '174 reference issued in the name of Mansen in that it comprises hand held configuration in which a male top housing slidably co-operatively engaging with a female bottom housing, wherein the top housing including downwardly projecting top blades, and the bottom housing including upwardly projecting bottom blades, such that food stuffs located with a cavity defined within the housings are sliced and diced upon rotation of the top housing relative the bottom housing.

While each of these references can provide chopping, dicing or comminuting of foodstuffs, none are specifically adapted to be used in conjunction with the infusion of essences released from the comminuted materials into an edible solvent. None of these references allow for the separation of solid foodstuffs to be comminuted within a container that further allows for the direct fluid communication of the liquids and comminuted solids, while still allowing for the controlled segregation of the comminuted solid components. Consequently, a need has been felt for providing an apparatus and method the mincing, grinding, chopping and general comminuting of any type of foodstuffs for the extraction of edible and aromatic oils with the purpose of directly blending or combining the freshly extracted edible and aromatic oils and such with a liquid.

SUMMARY OF THE INVENTION

It is therefore an object of the present invention to provide an improved essence extractor for comminuting of foodstuffs for the extraction of edible and aromatic oils.

It is a feature of the present invention to provide an improved essence extractor in combination with a liquid container and separated by a screening mechanism for the direct blending of freshly extracted edible and aromatic oils and such in a manner that creates an infused liquid, rather than an emulsion or colloidal suspension.

Briefly described according to one embodiment of the present invention, a portable essence extractor and liquid container combination is provided in which an essence extraction assembly may be removably connected to, and in fluid communication with, a liquid dispensing container in a leak proof manner. A screening mechanism separating the two generally limits the intrusion of pulp or solids into the liquid container. The separation of solids, while allowing mixing of liquids, encourages the creation of an infused liquid, rather than an emulsion or colloidal suspension. The liquid container may be formed to allow visual access to the dispensing volume. The liquid container may further be adapted to any number of industrial designs and for various purposes. The container may be used in conjunction with a cooking oil or salad dressing oil and, as such, may be in the form of a carafe so that cooking oils, such as, for example, extra virgin olive oils, can be infused with any various essences and flavors to create flavored cooking oils. The container may also be adapted for use in conjunction with other uses, such as with drinking beverages, condiments, syrups, or the like. The container may further be adapted as a drinking vessel, in which a drinking beverage contained therein can be infused with the essences from ground or comminuted fruit, vegetables, nuts, herbs, or any other type of ingredient. The fluid communication between a comminuting volume of the essence extraction assembly and the container allows these all natural ingredients to steep directly with the beverage, creating refreshingly flavored drinks that are as rich in nutrients as its ingredients. When adapted for use with drinking water, a sport cap may be provided to provide a spill-proof sip. When adapted for use with tea or other steeped beverages, the same reservoir may further include a café cap that allows for spill-proof sipping. When adapted for use in bartending, similar accommodation can be provided to allow for use with liquors and even wine.

In any such embodiment modified for a specific end use, the container is operatively connected to an essence extraction assembly such that it is removably connects to the liquid dispensing container, as well as in fluid communication with the liquid volume. A separation mechanism, such as a mesh, screen, net, web or other semi permeable barrier, is formed between the essence extraction assembly and the liquid container to inhibit the free mixing of "pulp" or solids into the liquid volume. Placement of the essence extraction assembly at the top, bottom, middle, or any specific orientation or configuration should be equivalent, given the fluid communication between the comminuted foodstuff and the liquid volume such that the extraction of edible and aromatic oils can directly blend with any liquid contents of the volume.

In accordance with a preferred embodiment, the essence extraction assembly will incorporate a comminuting mechanism that is generally adapted for the extraction of edible and aromatic oils from a broad variety of foodstuffs and is further received in an integrated fashion with a liquid storage vessel. It is anticipated that comminuting can include the chopping, dicing, blending, slicing, pulverizing, milling, grinding, fragmentizing, mashing, abraiding, mixing or otherwise reducing the solids of a foodstuff in a manner as to encourage or allow the extraction, mixing, leaching, decoction, elution, or otherwise removal of a targeted edible, flavorful or aromatic constituent.

An advantage of the present invention is that it allows the direct contact of the freshly extracted edible and aromatic oils and such with a target diluent while still allowing the separation or controlled introduction of solids into the final liquid product.

Another advantage of the present invention is that it can be used with a wide variety of target diluents for food, beverage or other gastronomic purposes, from cooking oils such as olive oil, canola oil or the like, to beverages such as water, seltzer, juices or the like and even beauty products.

Further, a preferred embodiment of the present invention is capable of being either hand operated or motorized, can be used with a variety of foodstuffs, can be used with a variety of cooking oils or beverages, and can be adapted for a variety of specific industrial designs.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 2 is a front elevational view of portable essence extractor in combination with a liquid container according to a first alternate embodiment of the present invention in which the container 14 is adapted for use in conjunction with a cooking oil, salad dressing oil or the like;

FIG. 3A is a cross sectional side view of a portable essence extractor in combination with a liquid container adapted for use as a beverage drinking container according to a second alternate embodiment of the present invention;

FIG. 3B is an exploded view of the cross sectional view of FIG. 3A;

FIG. 16 is a perspective illustration indicating the use of a hand grinding essence extractor in combination with a liquid container according to any typical embodiments of the present invention;

FIG. 17 is a schematic perspective view of a continuous blending/chopping infusion pitcher variant of the present invention of a hand slicing or chopping essence extractor in combination with a liquid container according to an exemplary sixth alternate embodiment;

FIG. 18 is a schematic representation of a continuous blending/chopping infusion pitcher variant of the present invention according to an exemplary seventh alternate embodiment;

DESCRIPTION OF THE PREFERRED EMBODIMENTS

The best mode for carrying out the invention is presented in terms of its preferred embodiment, herein depicted within the Figures.

1. Detailed Description of the Figures

Figure 1:
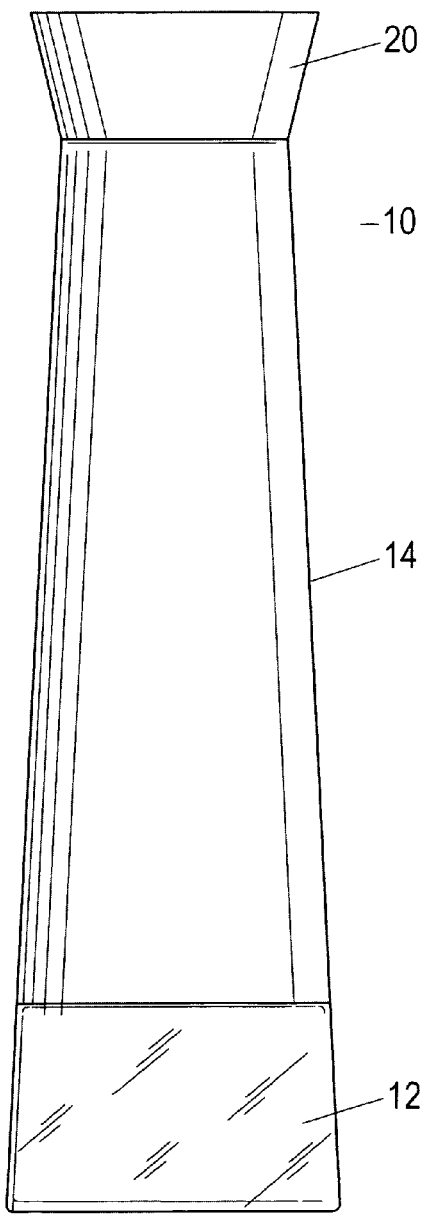
FIG. 1 is a front elevational view of a portable essence extractor in combination with a liquid container according to the preferred embodiment of the present invention.

Referring now to FIG. 1, a portable essence extractor and liquid container combination, generally noted as 10, is according to the preferred embodiment of the present invention is provided incorporating an essence extraction assembly or comminuting chamber 12 that removably connects to a liquid dispensing container 14. The essence extraction assembly 12 is further in fluid communication with the storage and dispensing volume 16 formed by the outer sidewalls 18 of the liquid container 14. A number of different varieties of essence extraction assemblies and/or storage and dispensing volumes are anticipated possible, as described in greater detail below. As further described, a number of different configurations enabling fluid communication also result.

Figure 2:
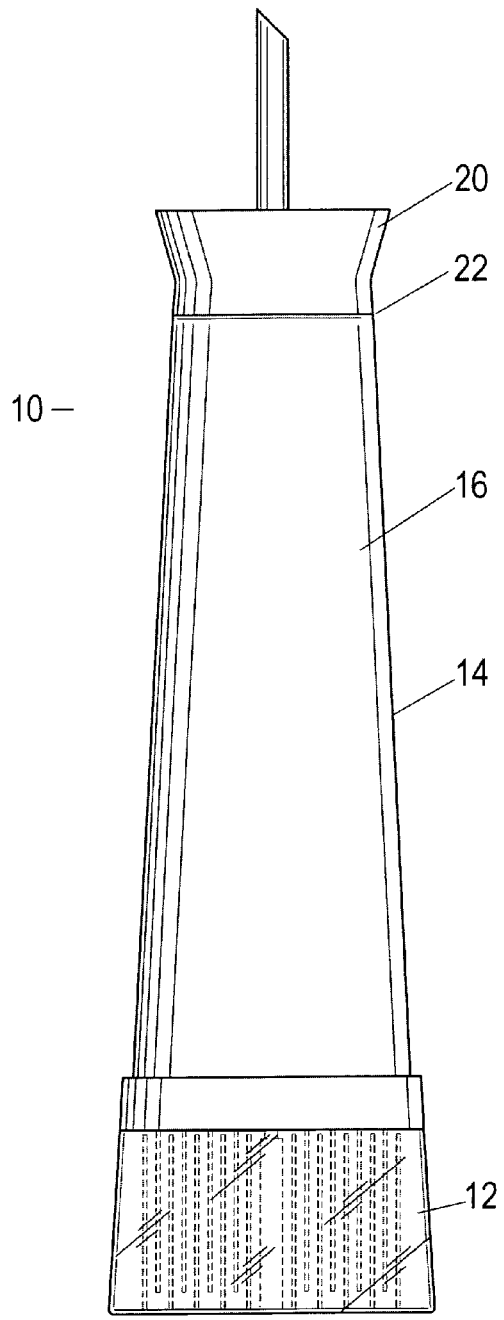
Figure 15:
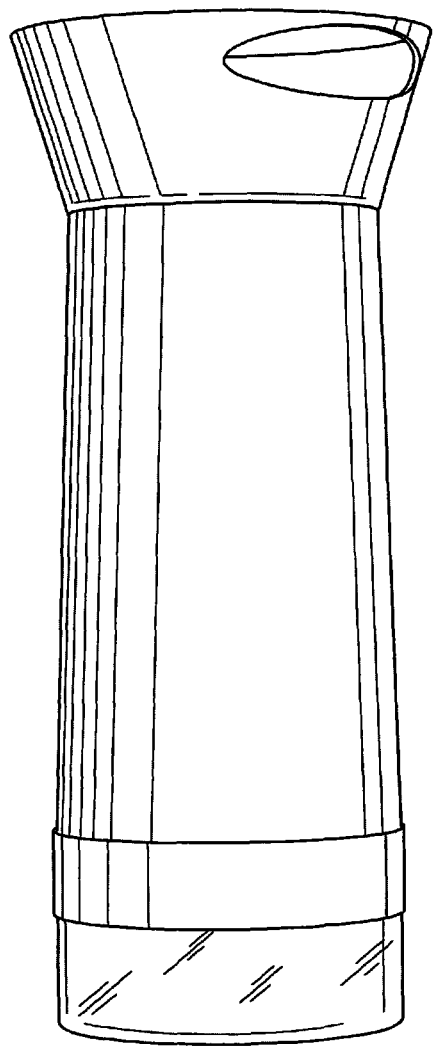
FIG. 15 is a perspective view of an exemplary alternate industrial design incorporating the functions of the present invention in an alternate design adaptable for use as a beverage vessel.
Figure 19:
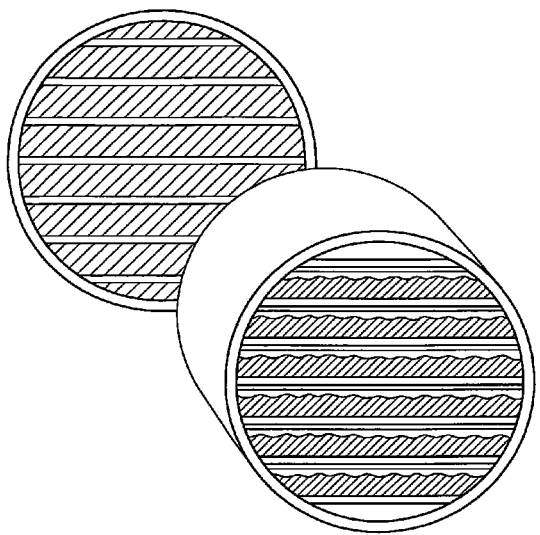
FIG. 19 is a schematic representation of the operation of the continuous blending/chopping infusion pitcher variant of the present invention according to FIG. 18.
Figure 20:
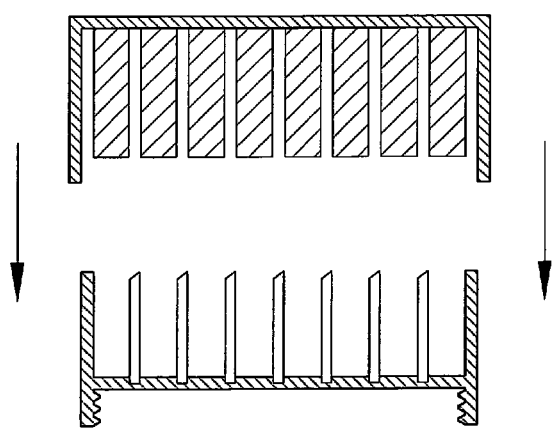
FIG. 20 is a cross sectional elevation schematic representation of a continuous blending/chopping infusion water bottle variant of the present invention, as well as its operation, according to an exemplary eighth alternate embodiment.
Figure 21:
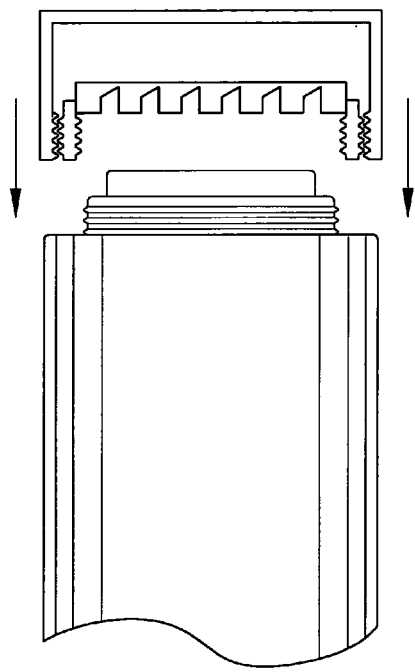
FIG. 21 is a schematic representation of a continuous blending/chopping infusion pitcher variant of the present invention according to an exemplary ninth alternate embodiment of the present invention.
Figure 22:
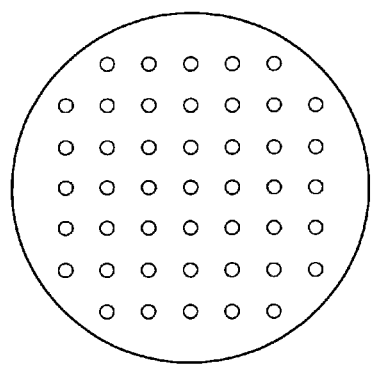
FIG. 22 is a schematic representation of a continuous blending/chopping infusion pitcher variant of the present invention according to an exemplary tenth alternate embodiment of the present invention.
Figure 23:
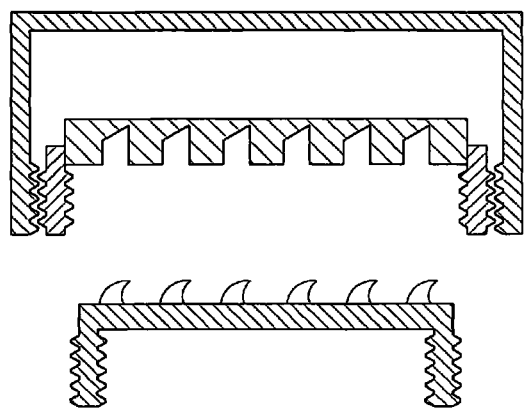
FIG. 23 is a schematic representation of a continuous blending/chopping infusion water bottle variant of the present invention according to an exemplary eleventh alternate embodiment of the present invention.
Figure 24:
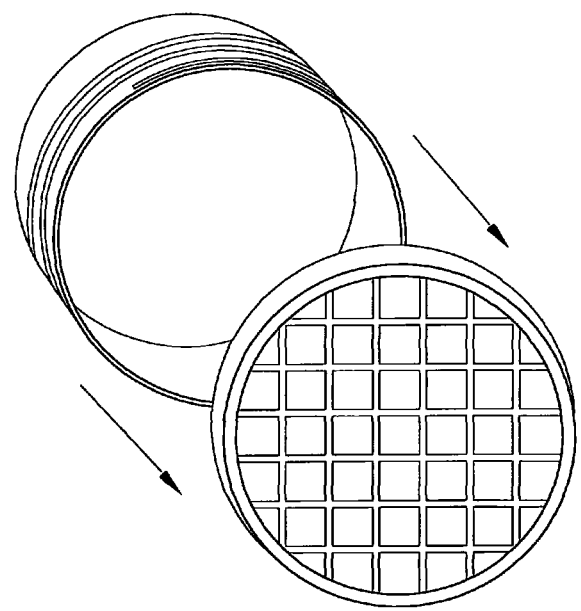
FIG. 24 is schematic representation of the operation of the continuous blending/chopping infusion water bottle pitcher variant of the present invention according to the eleventh alternate embodiment of the present invention.

The liquid container 14 is anticipated as being formed in a variety of materials, such as stainless steel to provide durability, or a clear polycarbonate or epoxy plastic that is free of PBA (Bis-Phenol A) to allow visual access to the dispensing volume 16. The container 14 itself may be adapted to any number of industrial designs and for various purposes. By way of example, the preferred embodiment is a liquid container according to any typical embodiments of the present invention, such as shown in FIG. 2 in which the container 14 is modified or adapted for being used in conjunction with a cooking oil or salad dressing oil and, as such, is in the form of a carafe in which an upper replaceable lid 20 is threadingly engaged with an upper opening 22 of the container 16. In this manner, cooking oils, such as, for example, extra virgin olive oils, can be infused with any various essences and flavors to create flavored cooking oils. However, the container 14 may also be adapted for use in conjunction with other uses, such as with drinking beverages, condiments, syrups, or the like, and as such the adaptation of the container is intended to be broadly construed in light of the adaptation of the container 14 is intended to be broadly construed in light of the other features, functions and intended uses of the present invention. By way of another example, and not as a limitation, FIG. 15 depicts the container 14 adapted as a drinking vessel, in which the lid is similarly threadingly engaged with the upper opening of the drinking container. In this manner, a drinking beverage contained therein can be infused with the essences from ground or comminuted fruit, vegetables, nuts, herbs, or any other type of ingredient. The fluid communication between the comminuting volume of the essence extraction assembly 12 and the container 14 allows these all natural ingredients to steep directly with the beverage, creating refreshingly flavored drinks. It is anticipated that a number of beverage options can exist, such as water, tea, vodka or other spirits. When adapted for use with drinking water, a sport cap (not shown) may be provided to provide a spill-proof sip. When adapted for use with tea or other steeped beverages, the same reservoir may further include a café cap (also not shown) that allows for spill-proof sipping. When adapted for use in bartending, similar accommodation can be provided to allow for use with liquors and even wine. Similarly, it is anticipated that a number of cooking options can exist, such as oil, vinegar, or syrups, with similar accommodations in the shape and intended use for the container 14. Given this broad anticipation of functionality, it should be obvious to a person having ordinary skill in the relevant art to find that adaptations or changes to the form or particular intended use of the container 14 would be equivalent to the present invention, or merely a design choice or alteration, or both.

Figure 4A:
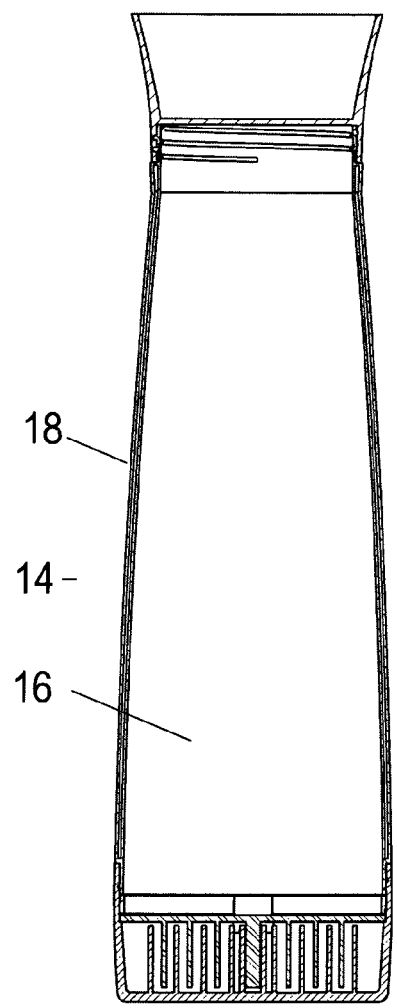
FIG. 4A is a cross sectional side view of a third alternate embodiment thereof.
Figure 4B:
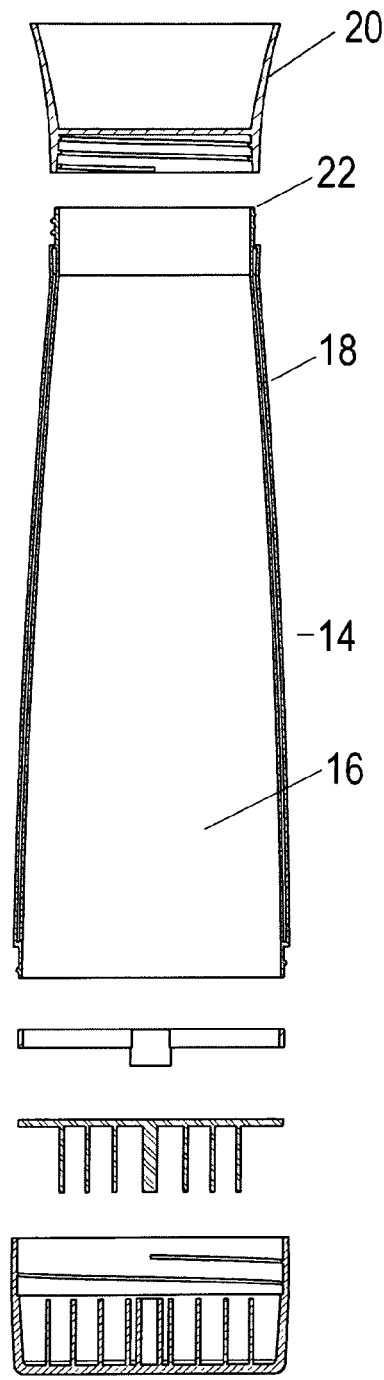
FIG. 4B is an exploded view of the cross sectional view of FIG. 4A.

As provided for in any embodiment, but as shown in conjunction with FIG. 3 and FIG. 4, the liquid container 14 is shown in a second alternate embodiment adapted for use as a beverage drinking container that is operatively connected to the essence extraction assembly 12 such that it removably connects to the liquid dispensing container 14, as well as being in fluid communication with the liquid volume 16 when connected. While the embodiments presented herein are shown anticipated the use of a cup shaped base 13 affixing to or received by the bottom of the container 14, such embodiments were selected as preferred design choices that enable the present invention, but were not intended as being strict limitations. Placement of the essence extraction assembly 12 at the top, bottom, middle, or any specific orientation or configuration should be equivalent, given the fluid communication between the comminuted foodstuff and the liquid volume 16 such that the extraction of edible and aromatic oils can directly blend with any liquid contents of the volume 16.

Figure 5:
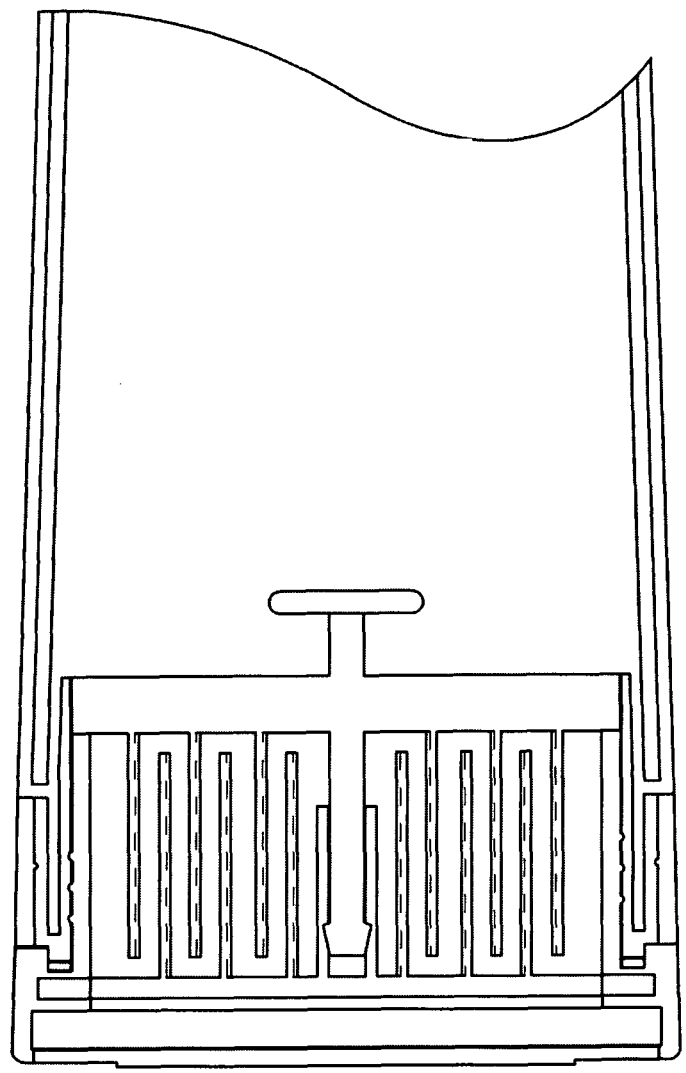
FIG. 5 is a side elevational lower assembly view showing an essence extraction assembly 12 in greater detail according to a portable essence extractor in combination with a liquid container adapted for use as a beverage drinking container according to a fourth alternate embodiment of the present invention.
Figure 6:
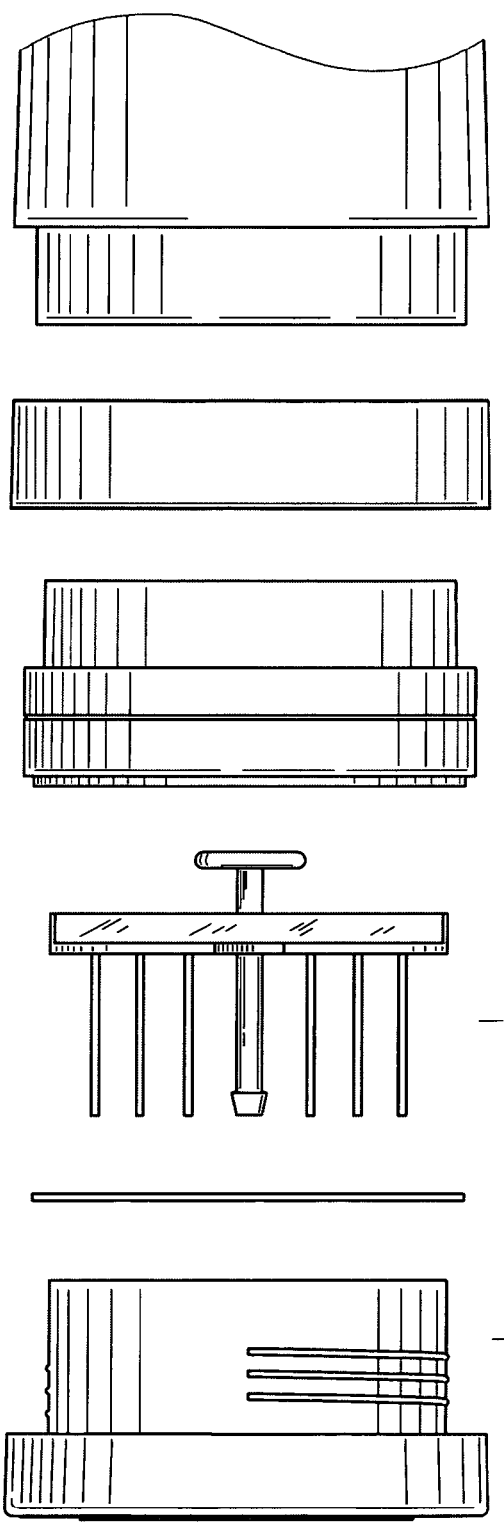
FIG. 6 is an exploded lower view of the cross sectional view of FIG. 5.
Figure 7:
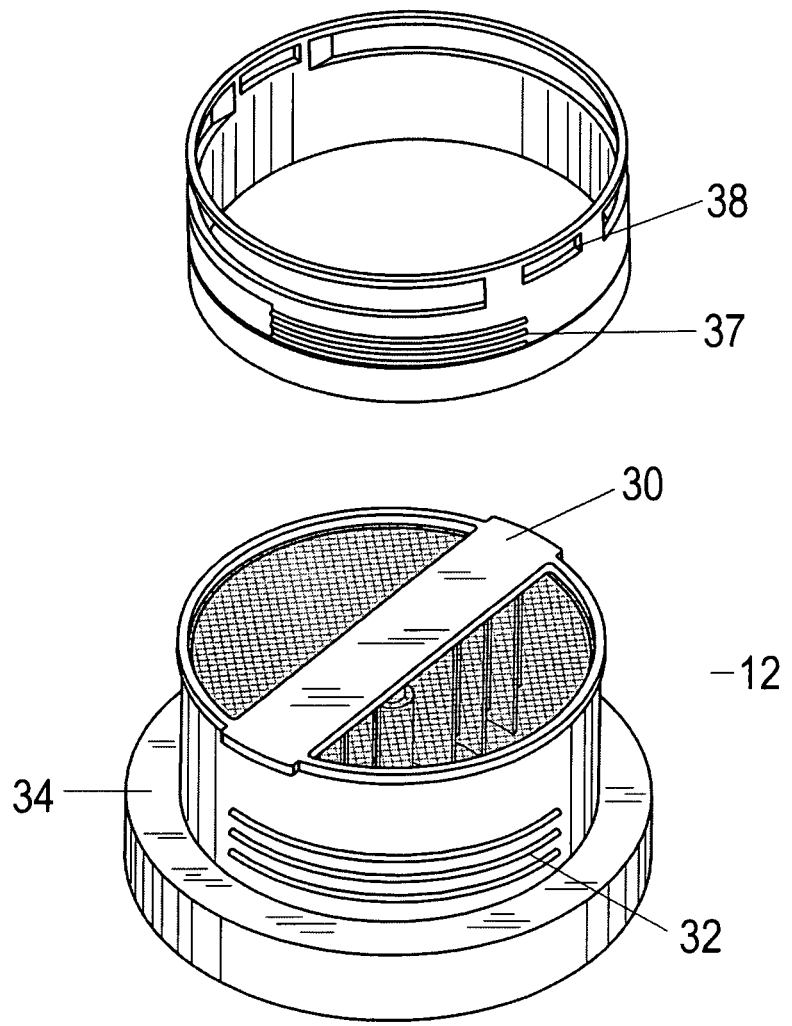
FIG. 7 is a partial exploded perspective view of a grinder assembly 12 according to a second alternate embodiment of FIG. 3A and FIG. 3B.

As shown in conjunction with FIG. 1-6, the essence extraction assembly 12 is shown in which the essence extraction assembly 12 is described in greater detail according to a first preferred embodiment of the present invention. In a manually operated configuration, the cup shaped base 13 is affixed to or received by the bottom of the container 14. In these embodiments, the base 13 receives an extraction assembly 17 having a comminuting mechanism 18. In this embodiment variation shown in FIG. 3b, the comminuting mechanism 18 is formed of a containment cap 19 retaining an upper blade support 17 that engages with a lower blade basket 21a affixed within the cup shaped base 13. An upper blade basket 21b fittingly internests within the lower blade basket 21a such as to form a rotary impingement mechanism 21 capable of comminuting foodstuffs placed there between. In the embodiment variation shown in FIG. 4b, the arrangement of upper and lower blades, as well as the containment and holding structures, are varied in orientation, thereby exhibiting the same comminuting function albeit with variations to the elements of the mechanism. In one embodiment as shown in FIG. 5, to accomplish comminuting a lower blade basket 21a is driven by an axle 23 that passes through the containment cap and received by and keyed to the cup shaped base 13. The upper blade basket 21b is keyed to the container 14, such that when the cup shaped base is twisted relative to the container 13, the upper and lower baskets 21b, 21a are counter rotated relative to each other and thereby allowing the opposed and blade elements create a mechanical comminuting effect within the essence extraction assembly 12. A separation mechanism 24 such a screen positioned between the extraction assembly 12 and the container volume 16 provides a containment mesh 24a for allowing fluid communication of liquid between the container volume 16 and the extraction assembly 12, while at the same time preventing the transmission or migration of retained comminuted foodstuff solids. Other variations, such as shown in FIG. 6-7, can be organized to accomplish the desired result, in embodiment shown as a twist base driving an axle and lower blades, thereby allowing the user to continuously grind an essence containing foodstuff wherein the solids are retained by a screen and the liquid extracted are allowed to be in fluid communication through the screen into the main vessel containment.

As shown, the essence extraction assembly 12 can be threadingly engaged with the lower opening of the container 14. As shown in FIG. 7 in an alternate configuration, the keyed protrusion 30 can be used in conjunction with partial threads 32. In such a configuration, once fruit, herbs, or other foodstuffs are added to the grinder cup 34 the upper grinder assembly 36 is inserted and the assembly guided into the base, of the container 14. Because the receptacle of the container 14 has a partial thread system 37, the assembly can be pushed until the keys on the lid engages with the corresponding locks 38 in the receptacle. Once engaged, the assembly is turned and spun into final position.

Figure 8:
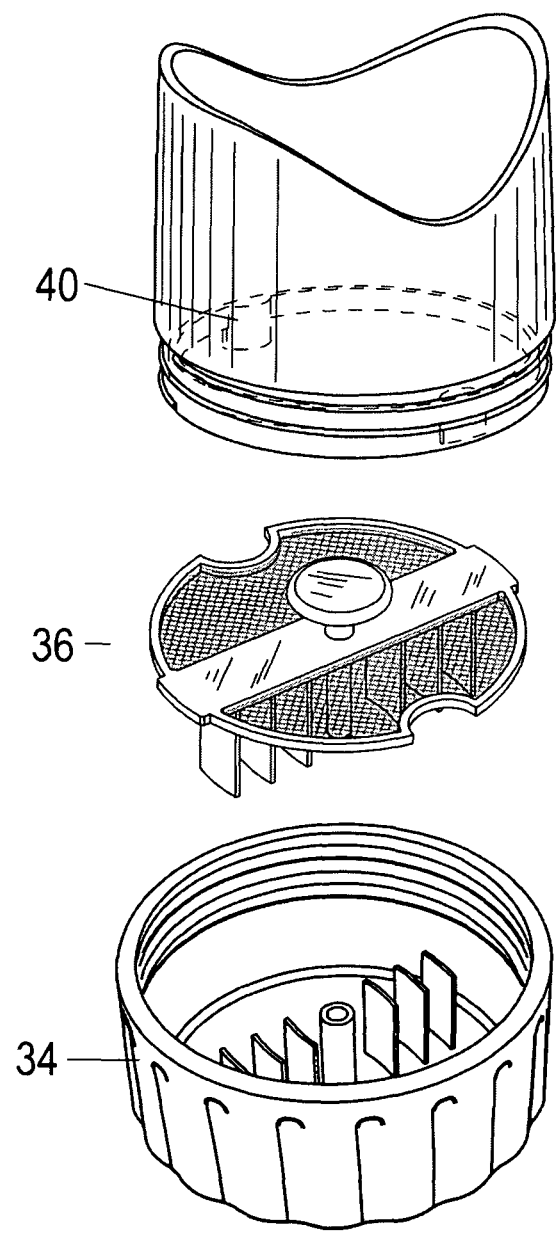
FIG. 8 is a partial exploded perspective view of a grinder assembly 12 according to a fifth alternate preferred embodiment of the present invention.

As shown in conjunction with FIG. 8, an alternate connection mechanism is displayed in which internal keys 40 within the container 14 function as guides to allow for proper alignment of the upper blade assembly 36 to be guided into proper alignment with the lower base 34 prior to threadingly engaging the lower base 34 to the container 14.

Figure 9:
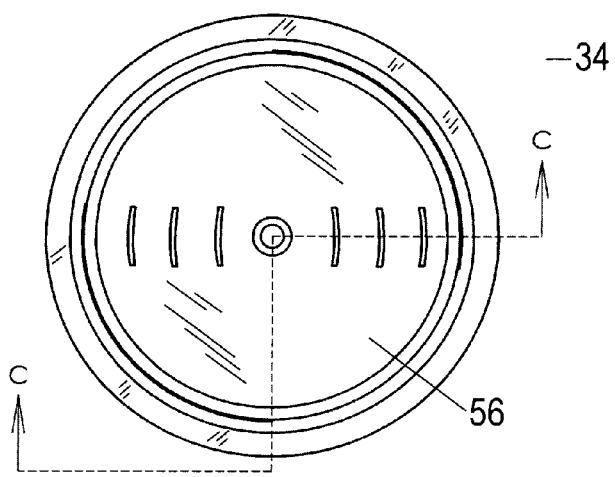
FIG. 9 is a top view of the lower blades and base element 34 for use with the fifth alternate embodiment of the present invention.
Figure 10:
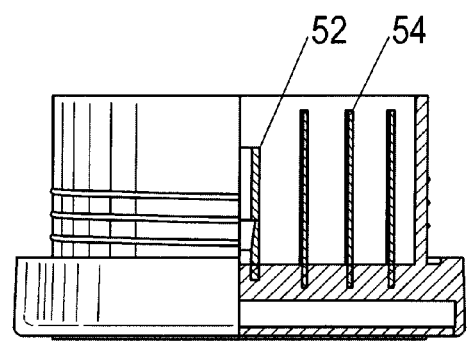
FIG. 10 is a cross sectional view taken along line C-C of FIG. 9.
Figure 11:
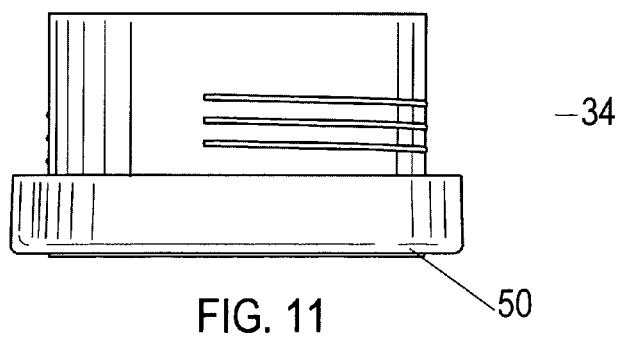
FIG. 11 is a side elevational view thereof.
Figure 12A:
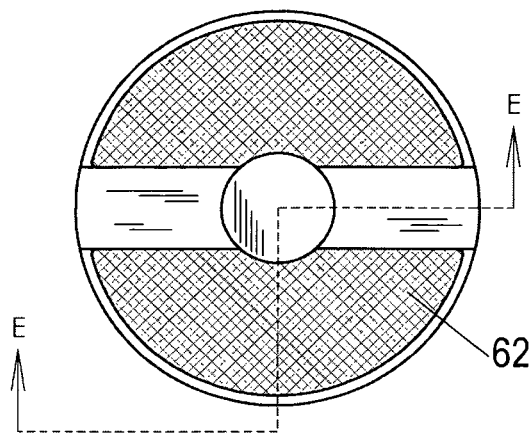
FIGS. 12A and 12B are top and bottom views, respectively, of an upper blade, screen and cap assembly 62 for use with the first alternate embodiment of FIG. 8 of the present invention.
Figure 12B:
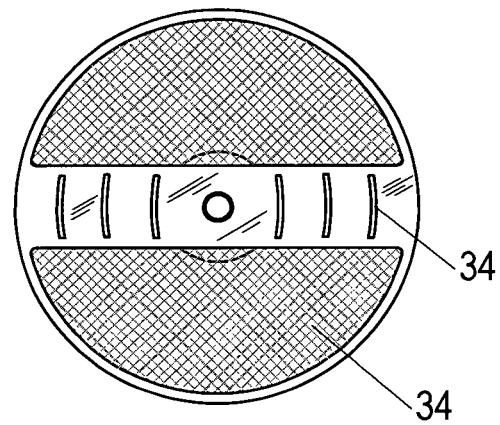
Figure 13:
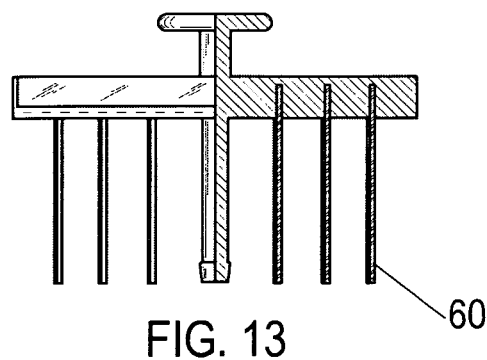
FIG. 13 is a cross sectional view taken along line E-E of FIG. 12A.
Figure 14:
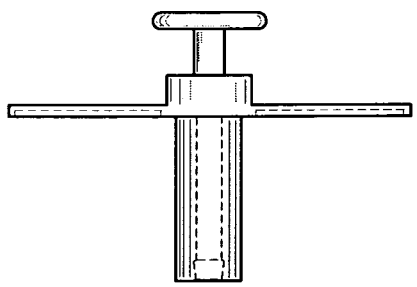
FIG. 14 is a side elevational view thereof.

In light of such anticipated variations, the lower base 34 is shown in greater detail in FIG. 9-11. The base 34 forms a lower cap 50; a barrel 52 extends vertically upward therefrom to receive and accept an axle of the upper blade assembly (described in greater detail below and in conjunction with FIG. 12a-14). Similarly, a plurality of vertically extended blades 54 protrude into a grinding volume 56 formed by the lower cap 50. While it is anticipated that a limited number of mechanisms for comminuting foodstuffs can be adapted for use with the present invention, acceptable are those capable of being hand operated and rotationally engaged about a foodstuff placed within the grinding volume 56. Once such adaptation is enabled as shown in which the blades 54 are spaced at selected radial distances from the center point in order to allow for the engagement of a plurality of vertically extended upper blades 60 protruding downward from a screen assembly 62. The spacing of the upper blades 60 and lower blades 54 at regular, nonconflicting intervals allow for engagement of the blades about any contents placed within the grinding volume 56 without impinging directly against each other. While such a configuration is designed to be capable of being manually operated in a rotational manner, it is anticipated that the use of motors to provide an electrically or battery powered mechanism would be an equivalent to or obvious extension of the teachings herein. It is further understood by those having ordinary skill in the relevant art that the technology for grinding foodstuffs has existed as far back as the use of grinding food between two rocks by early homo sapiens. As such, it should be apparent that only those that can accommodate the direct fluid communication of liquid with the comminuted foodstuffs while being comminuted are capable of being adapted for use with the present invention.

2. Operation of the Preferred Embodiment

In accordance with one embodiment of the present invention, as shown in FIG. 16, the operation of the present invention is shown in which foodstuffs, such as fruit, vegetables, herbs, nuts or the like, are placed in the lower cup and contained between the upper grinder lid. The assembly is then threadingly engaged onto the bottom of a container, and the container filled with a target diluent. The user is now able to grind fruit, vegetables, nuts, herbs, or anything desired foodstuff directly into the target diluent, such as a cooking oil, condiment syrup or beverage. This direct contact allowing the all natural ingredients to steep directly into the diluent, creates refreshingly flavored drinks, condiments or cooking oils and directly capturing nutrients or edible or aromatic extracts. The infused liquid can be consumed or used directly or indirectly from the container, and can be refrigerated after mixing. When emptied, the old ingredient can be discarded and the assembly components washed in preparation for reuse.

In accordance with a preferred embodiment, an extraction assembly is generally adapted for the extraction of edible and aromatic oils from a broad variety of foodstuffs and is further received in an integrated fashion with a liquid storage vessel. One general advantage of the present invention is that it allows the direct blending for freshly extracted edible and aromatic oils and such with a target diluent. As such, it is anticipated that various modifications may be made to allow for the chopping, dicing or comminuting of foodstuffs in specifically adapted configurations to allow the infusion of essences released from the comminuted materials into an edible solvent. By way of example, and not meant to be limiting, FIG. 17-27 depict various modifications to allow for a preferred release of essence through slicing, blending, muddling, chipping, vice pressing French pressing or grinding. In such an embodiment, the use of pitchers or water bottles, with or without separate comminuting chambers formed in conjunction with a cap are provided to receive the solid material and to allow for the sliced product to be dispersed (through gravity or mixing) into a liquid reservoir.

Additional examples showing various modifications are enabled to allow for a preferred release of essence through slicing or grinding. In such an embodiment, the use of lengthwise blades alternately intersecting with width-wise blades in a cross-cross patter to allow for the dicing or chopping of product that thereafter is dispensed (through gravity or mixing) into a liquid reservoir. Additionally, a grater blade element (FIG. 22) may be positioned around the cap to catch the chopped products at it is received into the cap, with the blades aligned such that the tips are all pointed directionally (i.e., clockwise direction, for example).

Figure 25:
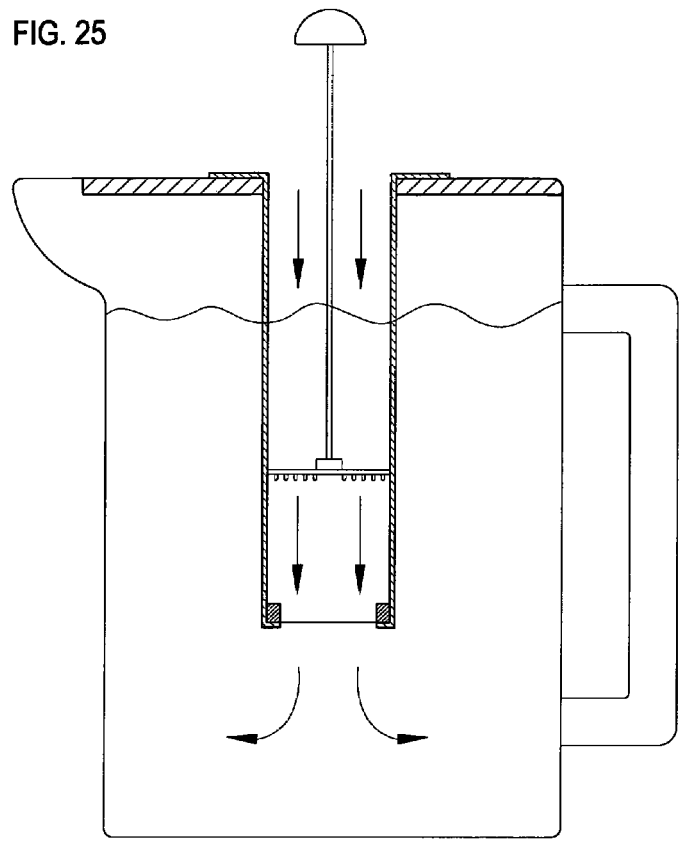
FIG. 25 is a schematic representation of a continuous blending/chopping with French press infusion water bottle variant of the present invention according to an exemplary twelfth alternate embodiment of the present invention.
Figure 26:
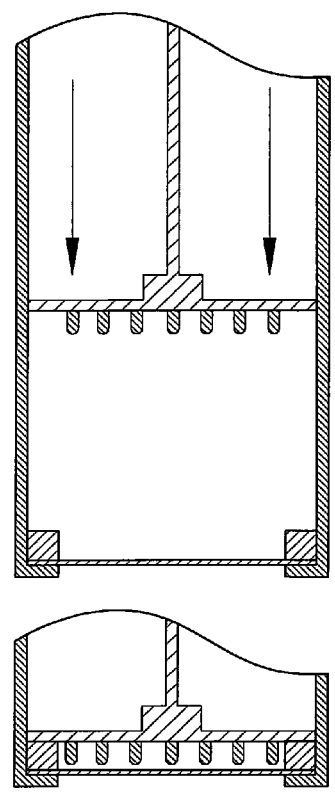
FIG. 26 is a schematic representation of a continuous blending/chopping infusion pitcher variant of the present invention according to an exemplary thirteenth alternate embodiment of the present invention.
Figure 27:
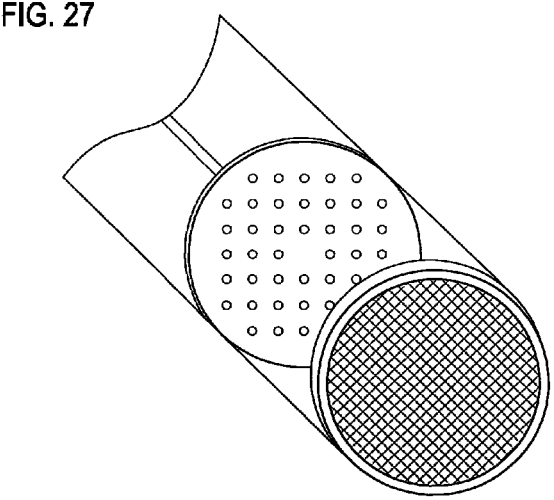
FIG. 27 is a side elevational view of an infusion pitcher incorporating the features and functions of the present invention according to a fourteenth alternate embodiment thereof.

Further examples showing a fourth, fifth and sixth alternate embodiment are depicted in FIG. 25-27 in which a liquid dispensing pitcher is provided incorporating the features and functions of the present invention. A press chamber centrally located within the pitcher is annularly surrounded by, and in fluid communication with, the fluid chamber.

The foregoing descriptions of specific multiple embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents. Therefore, the scope of the invention is to be limited only by the following claims.

Having thus described the invention what is claimed as new and desired to be secured by Letters Patent is as follows:

1. An essence extractor for comminuting of foodstuffs for the extraction and infusion of edible and aromatic oils comprising:
   an essence extractor;
   a portable liquid dispensing container that is removably connected to and contains said essence extractor, said liquid dispensing container further forming a leak proof, integrated and contained storage and dispensing fluid volume in continuous fluid communication with said essence extractor such that the continuous blending of freshly extracted edible and aromatic oils from said essence extractor is available directly within said liquid dispensing container; and
   a separation mechanism between said contained essence extractor and said liquid dispensing container, said separation mechanism adapted to obstruct communication of solids from said essence extractor while permitting fluid communication.

2. The essence extractor for comminuting of foodstuffs for the extraction and infusion of edible and aromatic oils of claim 1, wherein said liquid container is adapted for leak proof containment of an infused liquid.

3. The essence extractor for comminuting of foodstuffs for the extraction and infusion of edible and aromatic oils of claim 2, wherein said dispensing container further allows visual access to the dispensing volume.

4. The essence extractor for comminuting of foodstuffs for the extraction and infusion of edible and aromatic oils of claim 2, wherein said container is further adapted to a specific industrial design to coordinate with a targeted intended use.

5. The essence extractor for comminuting of foodstuffs for the extraction and infusion of edible and aromatic oils of claim 4, wherein said container comprises a cup, bottle or pitcher that is adapted for specific use with drinking beverages, condiments, syrups or beauty products.

6. The essence extractor for comminuting of foodstuffs for the extraction and infusion of edible and aromatic oils of claim 4, wherein said container is adapted for specific use with drinking water and further comprises a sport cap for dispensing contents from said reservoir.

7. The essence extractor for comminuting of foodstuffs for the extraction and infusion of edible and aromatic oils of claim 1, wherein said container is operatively connected to said essence extractor such that said essence extractor removably connects to the liquid dispensing container, as well as being in fluid communication with the liquid volume.

8. The essence extractor for comminuting of foodstuffs for the extraction and infusion of edible and aromatic oils of claim 1, wherein said essence extractor is positioned relative to said liquid dispensing container from an orientation selected from the group consisting of: above; below; or within.

9. The essence extractor for comminuting of foodstuffs for the extraction and infusion of edible and aromatic oils of claim 8, wherein:
   said essence extractor is adapted to comminute and contain foodstuffs and for being in direct communication with said liquid dispensing container;
   said liquid dispensing container is adapted to contain a liquid; and
   said separation mechanism comprises a screen having a mesh for allowing fluid communication of said liquid and retention of comminuted foodstuff solids.

10. The essence extractor for comminuting of foodstuffs for the extraction and infusion of edible and aromatic oils of claim 9, wherein said screen has a permeability selected for permitting a desired barrier to the communication of pulp into said liquid container.

11. The essence extractor for comminuting of foodstuffs for the extraction and infusion of edible and aromatic oils of claim 1, wherein said essence extractor comprises:
   a comminuting chamber for receiving desired foodstuff targeted for extraction of essential oils, juices or flavors;
   a comminuting mechanism contained within said comminuting chamber and forming an impingement mechanism capable of comminuting foodstuffs placed therein;
   wherein comminuting of foodstuffs and essence extraction thereby occur within a same containment space as infusion occurs.

12. The essence extractor for comminuting of foodstuffs for the extraction and infusion of edible and aromatic oils of claim 11, wherein said separation mechanism comprises a screen positioned between said extraction assembly and said container volume for providing a containment mesh for allowing fluid communication of liquid between said container volume and said comminuting assembly, while at the same time preventing the transmission or migration of retained comminuted foodstuff solids.

13. The essence extractor for comminuting of foodstuffs for the extraction and infusion of edible and aromatic oils of claim 11, wherein said essence extractor is adapted for comminuting a foodstuff for mixing into a liquid via a mechanism selected from the group consisting of grinding; chopping; slicing; grating; muddling; blending; pressing; and mashing.

14. The essence extractor for comminuting of foodstuffs for the extraction and infusion of edible and aromatic oils of claim 11, wherein said comminuting mechanism, further comprises an electric motor for driving said impingement mechanism.

15. An essence extractor for comminuting of foodstuffs for the extraction of edible and aromatic oils comprising:
   an essence extractor; and
   a liquid dispensing container that is removably connected to said essence extractor, said liquid dispensing container further forming a storage and dispensing fluid volume in fluid communication with said essence extractor such that the direct blending of freshly extracted edible and aromatic oils are mixed with a diluent liquid contained within said storage and dispensing volume;
wherein said container is further adapted to a specific industrial design to coordinate with a targeted intended use;
wherein said container is adapted for specific use with cooking oil or salad dressing oil and thereby forms a carafe;
wherein cooking oils can be infused with any various essences and flavors to create flavored cooking oils.

16. An essence extractor for comminuting of foodstuffs for the extraction and infusion of edible and aromatic oils comprising:
   an essence extractor wherein said essence extractor comprises a comminuting chamber for receiving desired foodstuff targeted for extraction of essential oils, juices or flavors;
   a comminuting mechanism contained within said comminuting chamber and forming an impingement mechanism capable of comminuting foodstuff placed therein, wherein said comminuting mechanism further comprises:
      a lower blade basket is driven by an axle that passes through a containment cap and received by and keyed to a cup shaped base;
      an upper blade basket keyed to said container such that when said cup shaped based is twisted relative to said container, said upper and lower baskets are counter rotated relative to each other and thereby allowing opposed blade baskets to create a mechanical comminuting effect within the essence extraction assembly;
   a liquid dispensing container that is removably connected to said essence extractor, said liquid dispensing container further forming a storage and dispensing fluid volume in fluid communication with said essence extractor such that the direct blending of freshly extracted edible and aromatic oils is available; and
   a separation mechanism between said essence extractor and said liquid dispensing container, said separation mechanism adapted to obstruct communication of solids while permitting fluid communication;
wherein comminuting of foodstuffs and essence extraction thereby occur within a same containment space as infusion occurs.

17. A method of blending freshly extracted edible and aromatic oils with an edible diluent liquid comprising:
   containing selected comminuting foodstuffs in an essence extractor;
   placing said essence extractor in fluid communication with a liquid dispenser forming a storage and dispensing fluid volume;
   separating said essence extractor from said liquid dispenser by a semi permeable member adapted to obstruct the communication of solids while permitting fluid communication; and
   comminuting said foodstuffs for the extraction of edible and aromatic oils such that the direct blending of extracted edible and aromatic oils are mixed with a diluent liquid contained within said storage and dispensing volume.

18. The method of claim 17, wherein said liquid dispenser and said essence extractor are connected in a leak proof interaction during the comminuting of said foodstuffs.

19. The method of claim 18, wherein said dispenser is adapted for specific use with drinking beverages, condiments, syrups, or beauty products.

20. A method of blending freshly extracted edible and aromatic oils with an edible diluent liquid comprising:
   containing selected comminuting foodstuffs in an essence extractor;
   placing said essence extractor in fluid communication with a liquid dispenser forming a storage and dispensing fluid volume;
   separating said essence extractor from said liquid dispenser by a semi permeable member adapted to obstruct the communication of solids while permitting fluid communication; and
   comminuting said foodstuffs for the extraction of edible and aromatic oils such that the direct blending of extracted edible and aromatic oils are mixed with a diluent liquid contained within said storage and dispensing volume;
wherein said liquid dispenser and said essence extractor are connected in a leak proof interaction during the comminuting of said foodstuffs; and
wherein said dispenser is adapted for specific use with cooking oil or salad dressing oil and thereby forms a carafe;
wherein cooking oils can be infused with any various essences and flavors to create flavored cooking oils.

21. A method of blending freshly extracted edible and aromatic oils with an edible diluent liquid comprising:
   containing selected comminuting foodstuffs in an essence extractor;
   placing said essence extractor in fluid communication with a liquid dispenser forming a storage and dispensing fluid volume;
   separating said essence extractor from said liquid dispenser by a semi permeable member adapted to obstruct the communication of solids while permitting fluid communication; and
   comminuting said foodstuffs for the extraction of edible and aromatic oils such that the direct blending of extracted edible and aromatic oils are mixed with a diluent liquid contained within said storage and dispensing volume;
wherein said dispenser is adapted for specific use with drinking water and further comprises a sport cap for dispensing contents from said liquid dispenser.

* * * * *